Sept. 29, 1936.　　　H. H. GEFFCKEN ET AL　　　2,055,487
PHOTOELECTRIC TUBE
Filed Nov. 16, 1932　　　4 Sheets-Sheet 1

INVENTORS
HEINRICH H. GEFFCKEN AND HANS R. RICHTER
BY
ATTORNEY

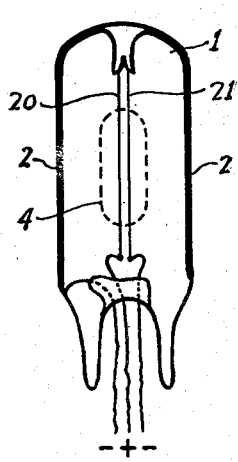
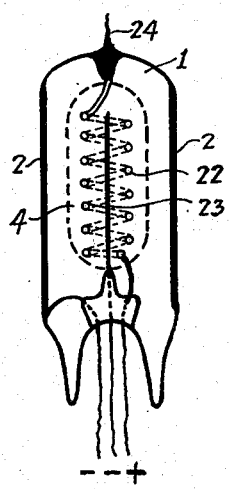
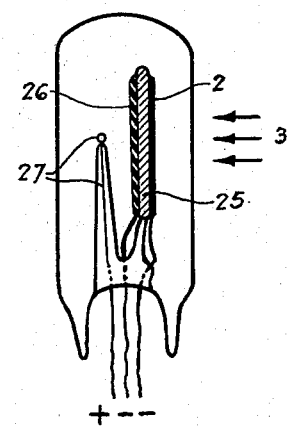
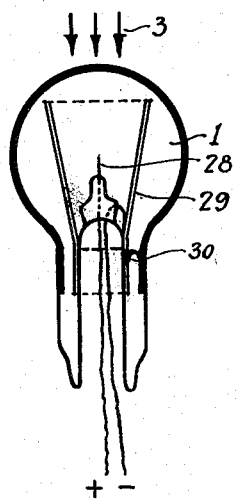
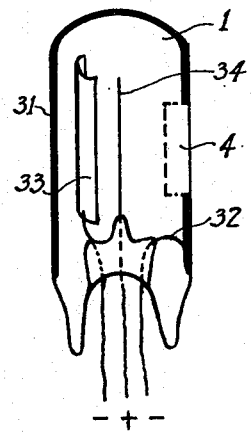
INVENTORS
HEINRICH H. GEFFCKEN AND HANS R. RICHTER

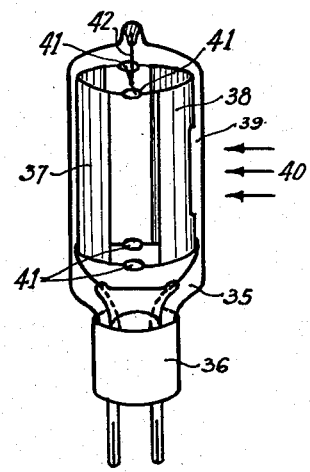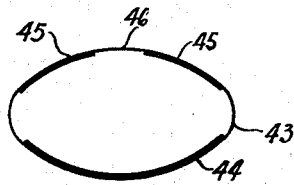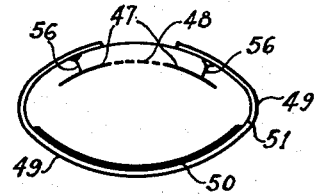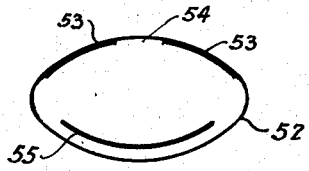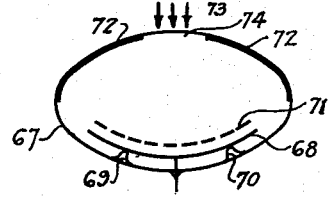

Sept. 29, 1936.    H. H. GEFFCKEN ET AL    2,055,487
PHOTOELECTRIC TUBE
Filed Nov. 16, 1932    4 Sheets-Sheet 4

INVENTORS
HEINRICH H. GEFFCKEN AND HANS R. RICHTER
BY
ATTORNEY

Patented Sept. 29, 1936

2,055,487

UNITED STATES PATENT OFFICE 2,055,487

PHOTOELECTRIC TUBE

Heinrich H. Geffcken and Hans R. Richter,
Leipzig, Germany

Application November 16, 1932, Serial No. 643,163
In Germany November 16, 1931

4 Claims. (Cl. 250—27.5)

Our invention relates to novel photoelectric tubes and more particularly to the arrangement and construction thereof.

Gas filled photoelectric tubes provide a relatively large current output and accordingly are especially desirable for light responsive power work such as the operation of relays, switches, and so forth, in response to a light beam.

Development of such a tube has, however, been retarded because of the rapid disintegration of the light sensitive cathode by the bombardment of positive ions produced by collision.

Accordingly, an object of our invention is to provide means in a gas filled photoelectric tube for preventing the bombardment of the cathode.

A further object of our invention is to provide auxiliary electrodes in a gas filled photoelectric tube.

Still a further object of our invention is to provide auxiliary electrodes in a gas filled photoelectric tube for conducting the current due to the positive ions.

In the operation of phototubes for sound reproduction, it is essential that the phototube faithfully follow the light fluctuations. We have discovered that by making full use of all of the available space within the tube, a much larger current output and a more sensitive operation can be obtained in the phototube.

Accordingly, a still further object of our invention is to provide a photoelectric tube in which substantially all the space of the tube is used for conduction and wherein no obstructions exist.

A further object of our invention is to provide anode electrodes as well as cathode electrodes secured against the wall of the phototube.

Still a further object of our invention is to provide apparatus for and methods of forming a non-microphonic phototube.

In the above, a non-microphonic phototube in which both the anode and cathode are mounted on opposite wall surfaces of the tube vessel as metallic depositions, is recited in the objects.

When the tubes are built into the sound reproduction apparatus, some indirect microphonic effect is obtained because the tube swings as a whole against its grounded metal housing. Naturally, this results in capacity changes which cannot be disregarded.

Accordingly an object of our invention is to provide a novel metal casing for a phototube.

Still a further object of our invention is to ground the phototube through a metallic shield.

Another object of our invention is to provide rigid supports for the electrodes in a phototube to prevent any microphonic vibration thereof.

There are other objects of our invention which, together with the foregoing will appear in the detailed description which is to follow in connection with the drawings, in which;

Figures 3 to 9 show further modifications of the electrode arrangements in our invention.

Figures 10 to 13a are diagrammatic views showing a special arrangement of the electrodes for taking full advantage of all the space in the tube.

A more detailed discussion of the invention disclosed in Figures 1 to 9 will now be given.

Our invention therein shown is characterized by the fact that in the interior of the tube, ions produced by electron collision are removed from the primary discharge path and neutralized by the use of suitably arranged, constructed and biased auxiliary electrodes. In this way the photo-electric layer is thoroughly guarded against disintegrating ion bombardment so that up to very high potentials, neither disintegration nor building-up of a space-charge leading to independent discharge can occur. The auxiliary electrodes were never so arranged, constructed and biased that they removed the ions arising from electron collision in the discharge space from the primary discharge path and brought them to neutralization far from the photo-electrically active layer.

The auxiliary electrodes executed, arranged and biased are denoted in the following development as "neutralization electrodes", expressing their function. It has proven useful to make these neutralization electrodes of a material of considerably higher cathode drop than the cathode. In this way it becomes possible to bias the neutralization electrode more strongly negative and at the same time bring it closer to the anode than is the photo-sensitive layer, without leading to the rupture of a glow discharge through ion collision produced by electrons liberated from the layer. These conditions become especially favorable when, in addition, the neutralization electrode is covered with a semi-conductor layer.

The method of our invention may be applied to very different forms of tubes.

In the following, the invention is further explained by a number of drawings. For convenience in referring to them, in all the drawings the tube-vessel is numbered 1; in most cases the photo-sensitive layer deposited on the tube wall 2; the arrow, indicating the entrance of light, 3; and, where it is present, the window intended for entrance of light, 4.

Figure 1:
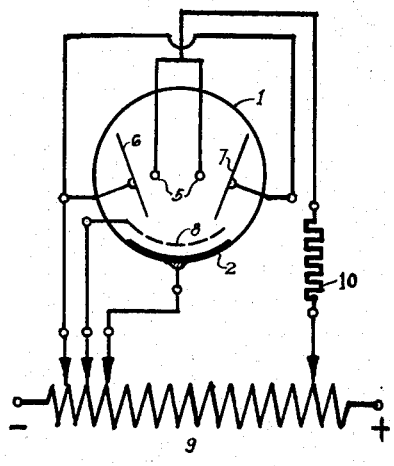
Figure 1 is a circuit diagram showing a gas filled tube in the circuit providing the necessary relative electrode potential in carrying out our invention.

Figure 1 shows the diagrammatic sketch of a gas tube as invented and the connections as invented. Inside the tubular tube-vessel shown in diagrammatic cross-section, are found the two anode wires 5, and the neutralization electrodes 6 and 7 whose surfaces run parallel to the anode wire 5. Directly in front of the photo-sensitive layer 2 is, further, arranged in a known way an open grid electrode which serves to check ions which happen to get into the field of the photo-sensitive layer. The photo-sensitive layer 2 consists of any suitable alkali metal covering of the glass wall. As a result it has a very low cathode drop. The auxiliary electrodes 6 and 7, on the other hand, are made of a material having a higher cathode drop than the photo-sensitive layer, such as iron and nickel. This cathode drop can be raised still more by coating with a semiconductor, such as nickel oxide, iron oxide, a thin sulphur layer or a thin selenium layer.

To show the potential distribution on the individual electrodes at a glance, a voltage distributor is provided from which the individual potentials are taken off. However, this does not limit the means of providing the relative potentials to a potentiometer device as shown. Use of batteries instead is one alternative. The checking grid 8 is biased a few volts negative to the photo-sensitive layer 2, while the neutralization electrodes 6 and 7 have the strongest negative potential. In the anode circuit there lies the output load impedance 10 from whose terminals, in the case mentioned, the control voltage can be taken in the usual way for an additional connected electron tube or the like. The current flowing through the output load impedance is, in the interior of the discharge vessel 1, carried by the photo-electrons given off by the photo-sensitive layer 2 as well as by the ions coming to neutralization on the auxiliary electrodes 6 and 7.

As shown in Figure 1, the neutralization electrodes 6 and 7 are considerably nearer the anode wire 5 than is the photo-sensitive layer 2. The probability is relatively great of the ions created in the discharge space, principally in the direct neighborhood of the anode 5, wandering to these neutralization electrodes. It is further helped by the large surface of the neutralization electrodes. This surface is designed to be greater at least than that of the anode, though serviceably even greater than that of the surface exposed to light, of the cathode. At the same time, the further advantage is hereby gained, that the ions are very much distributed in their impingement on the neutralization electrode, so that the probability of building up a space charge leading to independent discharge, is limited.

Figure 2:
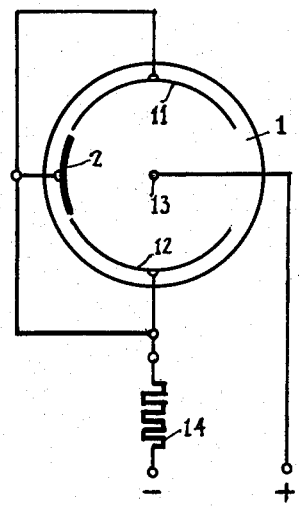
Figure 2 is a diagrammatic view showing a preferred arrangement of the electrodes.

A different, somewhat simplified example is shown in Figure 2. Here, an extraordinary uniform, centrally homogeneous field distribution is attained, by placing the photo-sensitive layer 2 not only in a cut-out part of the neutralization electrodes 11 and 12, but even on an equi-potential surface with them: for, the neutralization electrodes 11 and 12 and the photo-sensitive layer 2 surround anode 13 in the form of a cylinder, the anode wire 13 lying in the axis. With such an arrangement, it has proven especially useful to connect the neutralization electrodes 11 and 12 directly to the photo-sensitive layer 2. The working resistance 14 can then be placed simply in the current supply, and in this case will also have a current flowing through it which, in the interior of the discharge vessel 1, is carried by the photoelectrons given off by the photo-sensitive layer as well as by the ions reaching neutralization at the auxiliary electrodes 11 and 12.

For simplification of operation, it has proven useful in tubes of the last-named type, to connect the photo-sensitive layer with the neutralization electrode in the interior of the tube vessel, that is, in its housing.

A specially favorable field distribution is obtained when the neutralization electrodes are so arranged that they surround the anode.

Figure 3:
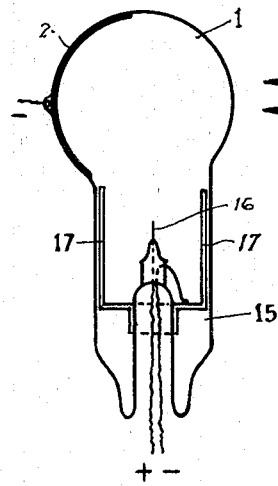

In order not to give rise to a disturbing shading effect of the neutralization electrode, and at the same time to limit the probability of ions bombarding the photo-sensitive layer, it has proven useful to place anode and neutralization electrode in an adjoining space of the tube vessel. An example of this type is shown in Figure 3. The tube vessel 1, with photo-sensitive layer 2, is equipped with a tubular extension space 15, inside which is found the pin-shaped anode 16, surrounded by the pot-shaped neutralization electrode 17. The neutralization electrode 17 must then, of course, have a correspondingly high cathode drop because of its comparative nearness to the anode; that is, less strongly negatively biased to the anode.

Figure 4:
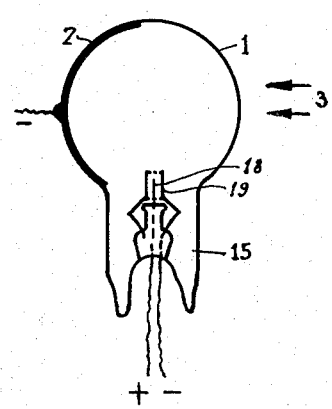

The arrangement shown in Figure 3 can be still further improved if the neutralization electrode is made in the form of a suitably narrow little tube whose radius is always smaller than the dark space of a possible glow discharge inside the tube vessel. In this way, ignition of a glow discharge between anode and neutralization electrode may be prevented up to very high voltages. An example of this type is shown in Figure 4. The tube vessel 1 with the photo-sensitive layer 2, is again provided with a tubular extension 15, inside which the pin-shaped anode 18 is arranged, the latter surrounded by the narrow small tube 19 serving as neutralization electrode.

It has been found especially serviceable to select the electrical field distribution inside the tube in such a way that the photo-electrons are accelerated as much as possible, beginning from the direct neighborhood of the cathode, and until ionization by collision occurs.

This can also be attained through the invention, especially by the neutralization electrode being set very close to the anode, so that only in the direct neighborhood of that anode through the neutralization electrode itself, corresponding potential differences are set up, and simultaneously, the removal and neutralization of the ions come about.

An example especially designed from this viewpoint is shown in Figure 5. In the inside of the tubular tube vessel 1, covered in the usual way on its inner wall with a photo-sensitive layer 2, two thin wires, 20 and 21, are stretched close together, the wire 20 serving as anode and the wire 21 as neutralization electrode. As a result there is formed between the two wires, that is, in the immediate neighborhood of the anode 20, a very strong electrical field, inside of which, in operation, occurs an intensive ionization by collision and simultaneously a considerable neutralization of the originated ions.

A corresponding effect can be obtained by using, for example, comb-type interlocking electrodes (anode and neutralization electrode) when working with a plane photo-sensitive layer.

Another example is shown in Figure 6, designed from a similar viewpoint. This design also starts with a tubular tube vessel in which the inner side of the tube wall carries the photosensitive coating. Its anode 22 has the form of a spiral in the axis of which the pin-shaped neutralization electrode 23 is set. Because of the enclosure of the neutralization electrode, the anode 22 works with only a medium potential on the photo-sensitive layer 2. First there occurs an ionization by collision in the immediate vicinity of the anode, and the ions created travel in the greatest proportion to the neutralization electrode 23.

Instead of making the anode 22 in the form of a spiral, it can, of course, be made screen or grid form. The form shown in Figure 6 has, however, a further advantage in so far as it makes it possible to subject the anode 22 to a permanent current flow through an auxiliary current source, with the aid of the second lead 24. In this way a magnetic field is set up in the interior of the tube, of which the lines of force run very exactly perpendicular to the movement of electrons and ions, contrary to previously known designs and deflect the electrons and ions into circular paths. Thus, their path is enlarged and the possibility gained to reach a still higher ionization amplification of the primary photo-electron current, without having to fear the rupture of the glow discharge.

A disadvantage of the latter construction consists in the producing by the anode and neutralization electrode a comparatively strong shading effect. According to the invention, this can almost entirely be avoided and at the same time, the probability of ions hitting the photo-sensitive layer can be further removed, by setting the anode as well as the neutralization electrode on the back of the photo-sensitive layer. An example is given in Figure 7.

The quartz plate 25 carries on its face the photo-sensitive layer 2 and on its back the neutralization electrode 26. The point-form electrode 27 serves as anode. Light enters in the direction of the arrows 3. The electrons given off by the photo-sensitive layer travel in curves toward the anode 27, set up behind the quartz plate 25, but are accelerated only on the last part of their path in the field between neutralization electrode 26 and anode 27, until ionized by collision. Almost all of the ions produced travel to the neutralization electrode 26. In a given case, the back of a metallic support for the photo-sensitive layer 2 can itself be used for neutralization electrode.

Another possibility to eliminate a shading effect of the neutralization electrode and the anode, consists in keeping the photo-sensitive layer transparently thin and allowing light to enter the tube through it. An example is given in Figure 8. The spherical tube vessel 1 is covered with a transparently thin photo-sensitive layer over its entire inner side, except for the base extension. Light enters in the direction of the arrows 3 through this photo-sensitive layer. Inside the tube vessel is set the pin-shaped anode 28, surrounded by the hollow cone-shaped neutralization electrode 29. This neutralization electrode 29 is connected directly to the photo-sensitive layer by wire 30, thus having the same potential. The said connection can be made as well in the interior of the tube base as of the tube vessel. The tube base is not shown in the drawings. Through the form of design sketched, fusing in is saved.

In certain circumstances disturbances in photo-tubes can be set up by electric fields arising from charges settling on the free parts of the glass wall. This disadvantage is avoided in our invention and at the same time advantages are gained, by covering the inner side of the tube wall, except for the window permitting entrance of light, with a conductive coating and using the latter for a neutralization electrode. In this way we also gain the largest area possible for the neutralization electrode within the tube vessel. An example of this type is shown in Figure 9. The wall of the tube vessel 1 is provided on its inner side with a conductive coating 31, (such as silvering) indicated in the drawing by a heavy line on the inner side of the tube wall. The coating is equipped with a current lead 32 which permits its use as neutralization electrode in the meaning of our invention. The silver plate 33, oxidized and then treated with caesium at a suitable temperature in a known way, serves for a photo-sensitive layer, while the wire pin 34 is provided as anode. Window 4 serves for admission of light. The ions originating in the immediate neighborhood of the pin shaped anode 34 travel, in by far the greater part, to the wall coating 31 and distribute themselves so extensively over its large surface that no building-up of a space charge leading to independent discharge can occur, even up to very high bias potentials. In such a tube it is not necessary to make the neutralizing electrode negative to the cathode; it is sufficient to make it negative to the anode. The distribution of electrode potentials may be chosen as follows: Cathode 33, zero volts, neutralizing electrode 31, plus 20 volts, anode 34, plus 100 volts.

We have shown that in accordance with our invention there is obtained not only an extraordinary shielding of the photo-sensitive layer, but also surprisingly higher tube currents than heretofore has been possible in any way. The invention is therefore not only suitable to make possible the abandonment of input amplifiers in sound-film reproductions and nevertheless be sure of operation for months, but it also permits the use of directly connected normal mechanical relays in combination with photo-tubes to controls of various types.

A more detailed discussion of the invention as disclosed in Figures 10 to 13a will now be given.

The invention therein shown is characterized by the fact that the tube electrodes of extensive surface are closely adapted to the inner wall surfaces of the tube vessel and that their interior space is kept free from any members between them which might hinder the path of the electrons. It was observed that in this way the smallest space charge disturbances were obtained and, in addition, the possibility of undisturbed attainment of unusually high ionization amplification factor. These conditions become most advantageous if the tube is given the usual well known oval cross-section. Moreover, there are a number of advantages in the invented tubes especially important for light-sound reproduction.

An example of the invention is shown first of all in Figure 10. Inside the tube vessel 35, equipped with base 36, are found the two curved electrode plates 37 and 38 which are closely adapted to opposite outer wall surfaces of the tube. The tube vessel has preferably an oval cross-section in which the longer axis of this cross-section stands perpendicular to the entering light. When potential is applied, an electrical field is set up between the surfaces 37 and 38 of very small density of lines of force, which thereby traverses a very large volume of gas in comparison to the available space. The electrode plate 37 is silvered in the usual way, then oxidized, and finally coated with caesium at higher temperature. It serves as photo-sensitive cathode. The electrode plate 38 is provided with the cut-out window 39 which permits entrance of light to the cathode 37 in the direction of the arrows 40. To support the electrodes firmly against each other, the glass bridges 41 are provided, of which the two upper ones are joined together and propped against the tube vessel by means of the strut 42. Through this, sensitivity to vibration of the tube is greatly lowered.

Tubes of the described type and appropriate gas filling, at an extinction potential of about 180 volts, can reach sensitivities up to 150 microamperes per lumen and more, with a difference of potential of 100 volts; and even up to 500 microamperes per lumen and more with differences of potential of above 170 volts. Operation at the latter high potentials could be maintained for hundreds of operating hours without injury to the tube.

Instead of mounting both electrodes free, as in Figure 10, it is found useful, in order to improve on the utilization of space to bring one or both electrodes directly on the glass wall, in form of metallic deposits. The cross-section of such a tube is shown in Figure 11. The oval tube vessel 43 carries in its interior on one side, the cathode metal coating 44 with a photo-sensitive coating, and on the other side, the anodic metal coating 45 with the window 46 cut out. With tubes of this type still better results are obtained than with that described in Figure 10 because of the absence of all wall charges.

In addition, they are entirely non-microphonic in themselves. On the other hand, to attain and maintain perfect insulation, all traces of superfluous alkali metal must be expelled with extreme care.

Because of this, it is more useful to move at least one of the electrodes away from the wall. Best suited for this is the anode, with which it becomes possible without too great an increase in capacity, to provide the said tube with an outer conductive coating. The latter is connected to the cathode (which is grounded in any case in light-sound apparatus) and keeps away external capacitative or high frequency effects from the tube. An example of this appears in Figure 12. Inside the tube vessel 51 is the photo-sensitive cathode 50 again directly laid as a metallic covering on one half of the glass inner wall, while a plate 47 with window 48 serves as anode. The latter is set off from the tube wall a few millimeters, is carried on the braces 56, and is propped against the tube vessel. The whole tube except for the window 48 is covered with a metallic coating 49 produced by spraying or the like, connected with the cathode 50. Tubes of this type show a capacity of only 15 to 20 centimeters according to the G. C. S. unit system in spite of their complete shielding.

In certain cases, however, it proved more beneficial to set not the anode, but the cathode back from the tube wall. This is especially successful for example, when, to achieve special spectral distribution of sensitivity for reproducing color film, a method of handling the coating base is called for, which offers a massive supporting sheet. In that case, the choice of a tube-form as in Figure 13 is advisable.

In the tube vessel 52, there is found in the form of a metallic wall coating, on the one side, the anode 53 with the window 54. Opposite the latter, on the other side, stands the supporting plate 55 coated with the photo-sensitive coating. So far as in such tubes it is satisfactory to use a cathode oxidized in the course of manufacture by glow discharge, it is advisable to set the back surface of the supporting plate 55 less than 4 micrometers away from the tube wall, so that during this oxidation the glow discharge does not intrude into the narrow space thus formed. Thus is prevented the formation of a reservoir of adsorbed alkali metal, from which free alkali metal could again be liberated.

It is possible to increase still further the sensitivity, rapidity of response and length of life of the tubes made according to our invention by using the dish-shaped electrode referred to, heretofore used as anode, not as anode but as negative biased auxiliary electrode, and by providing in addition to it and the cathode, a special anode inside the photo-electric tube. The cross-section of such a tube is shown in Figure 13a. Inside the oval formed tube-vessel 67 is arranged the free-standing cathode 68 with a light sensitive coating. It is propped against the wall at points 69 and 70. Opposite this cathode stand a mesh anode 71 with its surface arranged parallel to the cathode, and the auxiliary electrode 72 formed as a metallic cover on the opposite wall surface. In practice in the industry, the cathode 68 is, for example, connected with zero potential, the anode 71 with plus 100 volts, and the auxiliary electrode with minus 20 volts. As soon as light in the direction of the arrow 73 enters the tube through window 74, electrons are liberated from the photo-sensitive coating 68, fly through anode 71, and give rise to positive ions in the space between the latter, and the auxiliary electrode 72. After their energy is dissipated they travel back to anode 71, while the generated ions discharge on the auxiliary electrode 72 which is to say, they are kept away from the photo-sensitive coating 68. In order to be able to give a sufficient negative bias without the danger of a discharge-breakdown at the auxiliary electrode 72, it is well to provide the auxiliary electrode with a coating of higher cathode drop than the cathode drop of the photo-sensitive coating 68, as mentioned previously in case of other tubes. Since the cathode drop of the photo-sensitive coatings is very low, it is necessary for this purpose to keep the auxiliary electrode 72 merely free of alkali-coatings or to coat it with graphite, molybdenum or the like. As mentioned in the case of other tubes, it proves especially useful to coat it with a semi-conductor, such as suitably thick iron oxide, distilled selenium, etc. This prevents the breakdown of an independent discharge between electrodes 72 and 71, up to very high potentials.

In such a tube we arrive at a practically complete liberation of the photo-sensitive coating from the destructive action of the ions, thereby attaining an increased life span of the tube, and moreover we make it possible to use coatings of such complicated structure and such high emission as have heretofore been only practicable in high vacuum tubes, because in gas-filled photo-electric tubes, up to the present invention, they have immediately been disintegrated by ion bombardment.

A more detailed discussion of our invention as disclosed in Figures 14 to 16 will now be given.

By means of the invention, the disadvantage of capacity effects due to vibrations of the tube as a whole with respect to surroundings is avoided by surrounding the tube with a metal cloak tightly bound to the tube, except for the window arranged for the entrance of light and for the necessary insulation paths. This cloak is grounded and for this purpose preferably from the beginning on, is securely connected conductively to the tube electrode, generally cathode, which is to be grounded. In this way the capacity of the tube has a single value and is fixed in a way which can no longer be influenced by movements of the tube. That this capacity is somewhat larger than with normal tubes is, with modern high potential tubes, of secondary importance.

In the case of tubes with movable inner members, such as anodes, plate cathodes or the like, the grounded metallic outer coating produces no more than a shielding against undesired high frequency effects. In fact it is more likely to increase than to reduce the microphonic effect.

The aim of our invention can be successfully attained when all the electrodes, on the one side, and the grounded outer covering on the other, are arranged to be wholly immovable; that is, arranged perhaps on both sides of one and the same glass wall in the form of thin coverings.

The grounded metal covering can be built up in various ways. The very smallest microphonic effect is obtained by using a thin metal conductive coating, produced by silvering, spraying, or the like, and lying directly on the glass wall. If special stress is laid on lowered capacity, it is advisable to push a metal tube over the tube and pour cement between.

Figure 14:
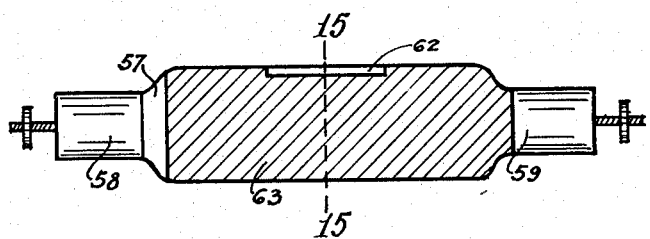
Figures 14 to 16 are diagrammatic views showing metallically shielded photoelectric tubes.
Figure 15:
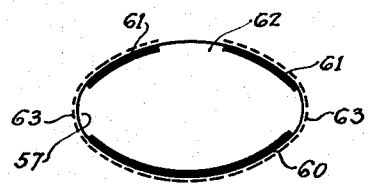

An example of the first-mentioned kind is shown in Figures 14 and 15 in side view and cross-section (across line 15—15), respectively. The elongated, flattened tube vessel 57 with the pole caps 58 and 59, carries in its interior, the coatings 60 and 61 applied directly to the glass wall as thin coverings, for example, as silvering; of these coatings, 60 is used as photo-sensitive cathode, and coating 61 as anode. The window 62 is provided for entrance of light and 63 is the conductive coating of the invention; in the present case applied directly to the outer wall of the tube. This is indicated in Figure 14 by shading. As may be seen from Figure 14, it is connected with the cathodic lead-cap, while on the left side of the tube it does not quite reach to the anodic cap 58. To protect the cover 63 from corrosion and mechanical injury, it is suitably lacquered.

Figure 16:
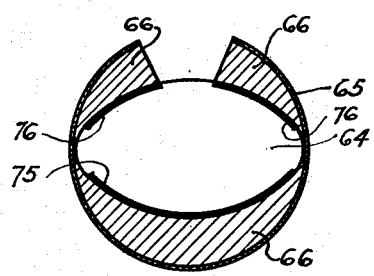

A tube of different lower capacity design is shown in cross-section in Figure 16. The tube vessel 64 again has oval cross-section, while the metal cloak 65 (sheet metal tube) is round. The space between is filled up with a suitable cement mass 66 which establishes rigid connection between tube and cloak, and maintains the cloak upright. Tubes of this kind are likewise practically completely non-microphonic and can be rigidly built into the sound apparatus. They present a substantially reduced capacity as compared with the tubes shown in Figures 14 and 15.

Although we have described preferred forms of our invention, it will be obvious to those skilled in the art that it may take other forms which come within its scope, and we do not wish to be limited by the illustrations herein given except as set forth in the appended claims.

We claim:

1. A photo-electric tube comprising a gas filled envelope containing an anode electrode, a cathode having a sensitized surface responsive to light, and an auxiliary electrode located within said tube to draw off positive ions and having an electrical connection with said cathode within the tube, said auxiliary electrode being coated with a semi-conductor to increase its cathode drop with respect to said sensitized surface.

2. A photo-electric tube comprising a gas filled envelope containing a plurality of cooperating electrodes, one of which is a light responsive member and sensitive to positive ion bombardment, and a further auxiliary electrode within said envelope for collecting positive ions for protecting said light responsive member from excessive positive ion bombardment, said auxiliary electrode being coated with a semi-conductor to secure a higher cathode drop with respect to said light responsive member.

3. A photo-electric tube comprising a gas filled envelope containing a plurality of cooperating electrodes, one of which is a light responsive member and sensitive to positive ion bombardment, and a further auxiliary electrode within said envelope for collecting positive ions for protecting said light responsive member from excessive positive ion bombardment, said auxiliary electrode being provided with an oxide coating to increase its cathode drop with respect to said light responsive member.

4. A photo-electric tube comprising a gas filled envelope containing a plurality of cooperating electrodes, one of which is a light responsive member and sensitive to positive ion bombardment, and a further auxiliary electrode within said envelope for collecting positive ions for protecting said light responsive member from excessive positive ion bombardment, said auxiliary electrode being coated with a material adapted to secure a higher cathode drop with respect to said light responsive member.

HEINRICH H. GEFFCKEN.
HANS R. RICHTER.